Patented Mar. 6, 1923.

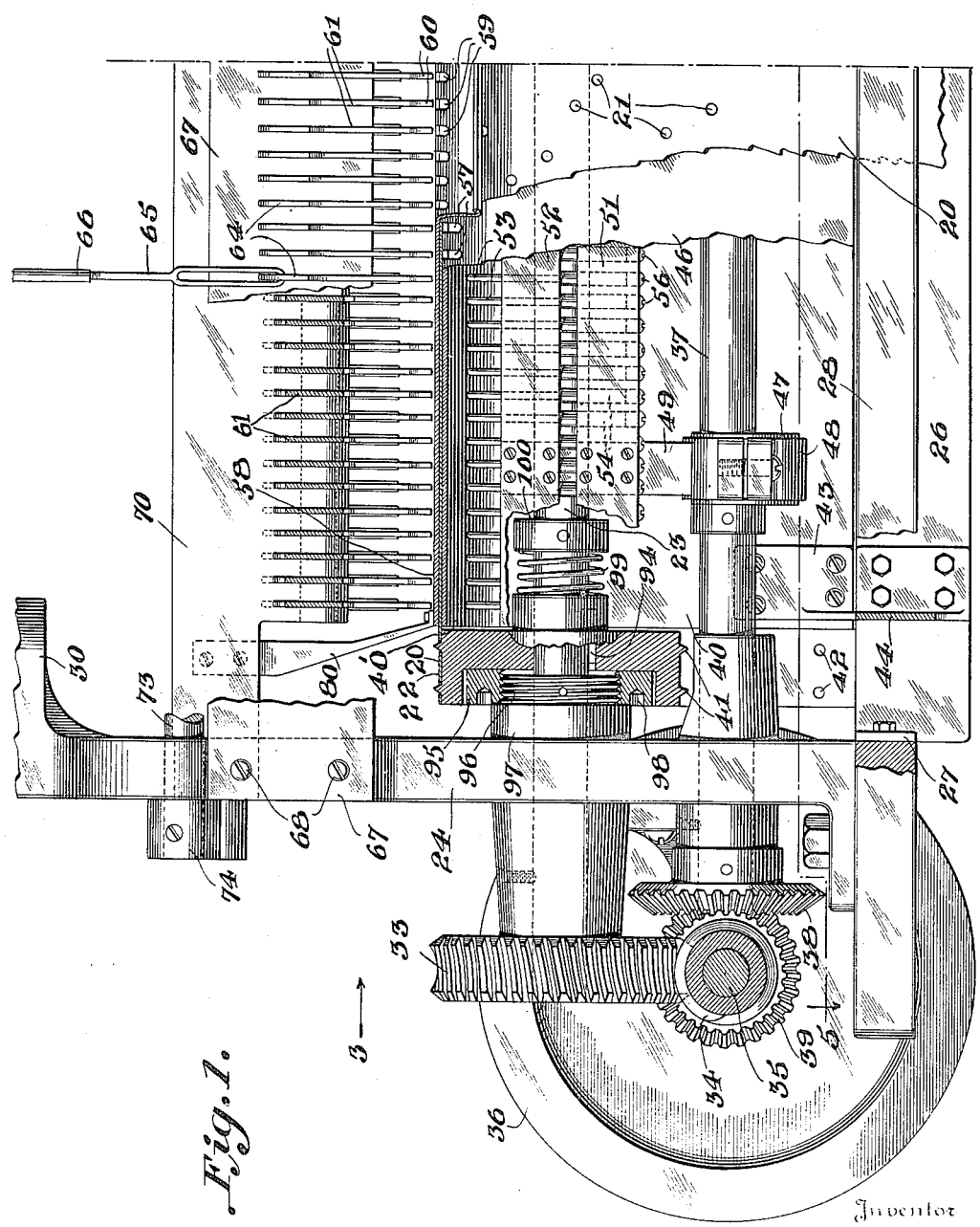

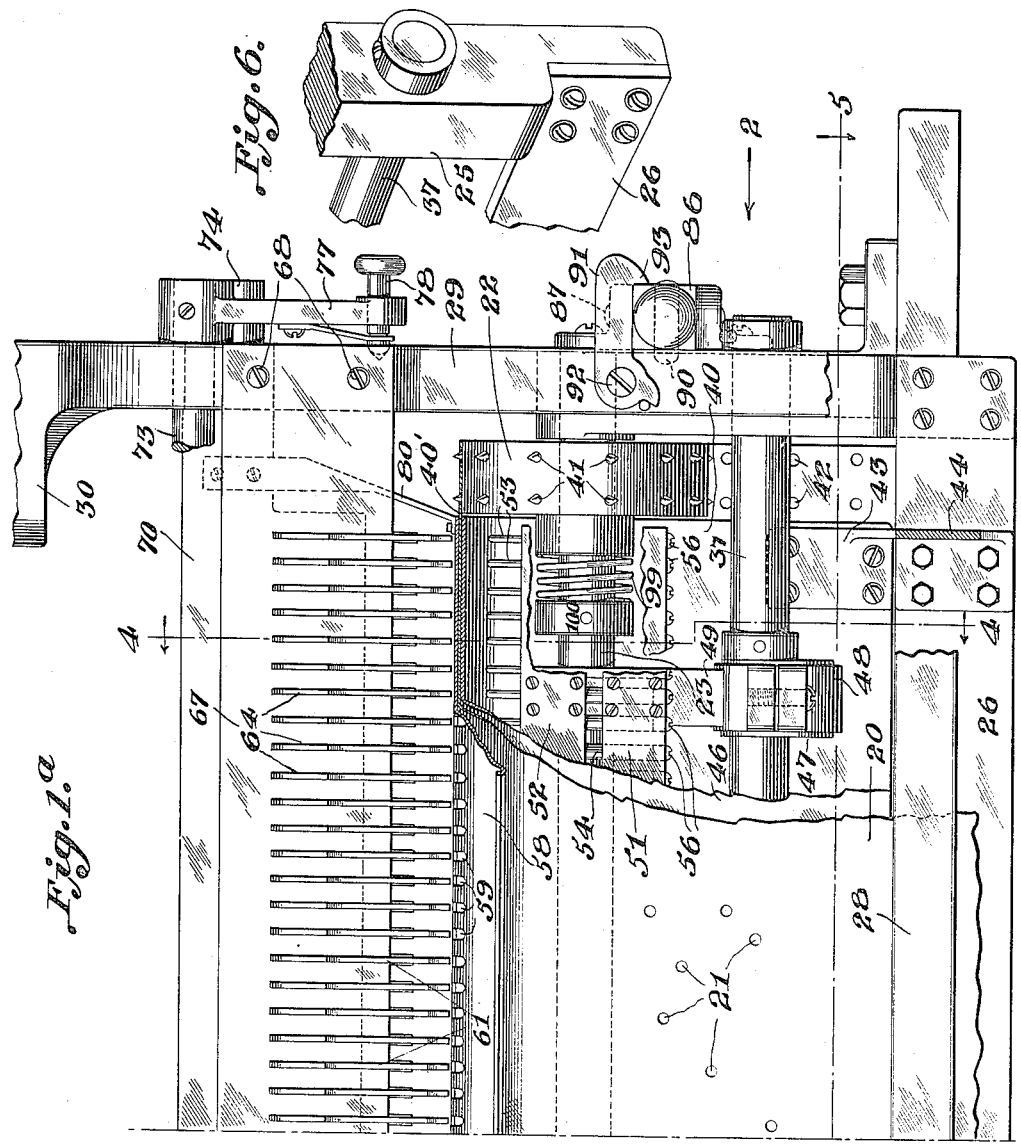

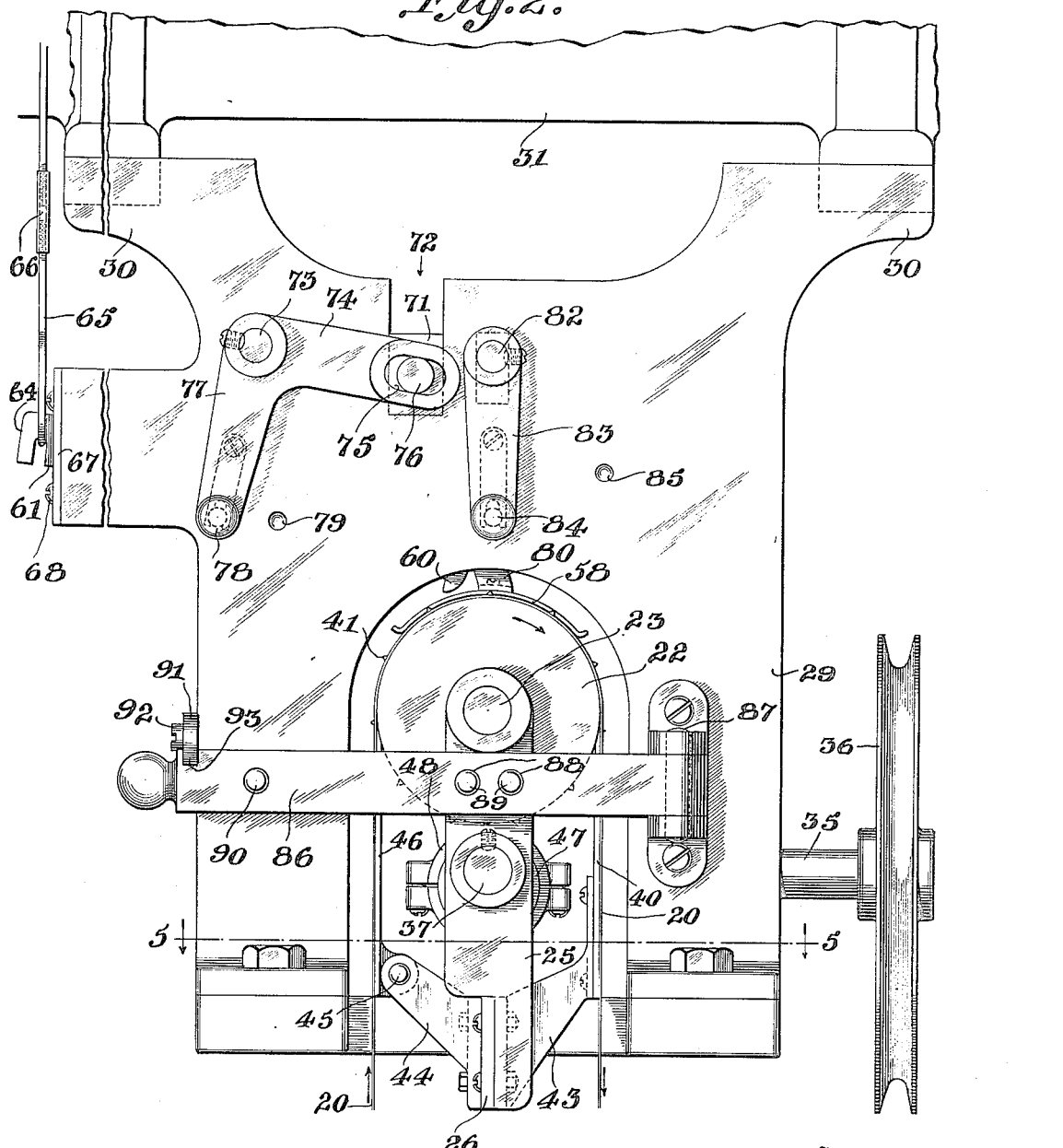

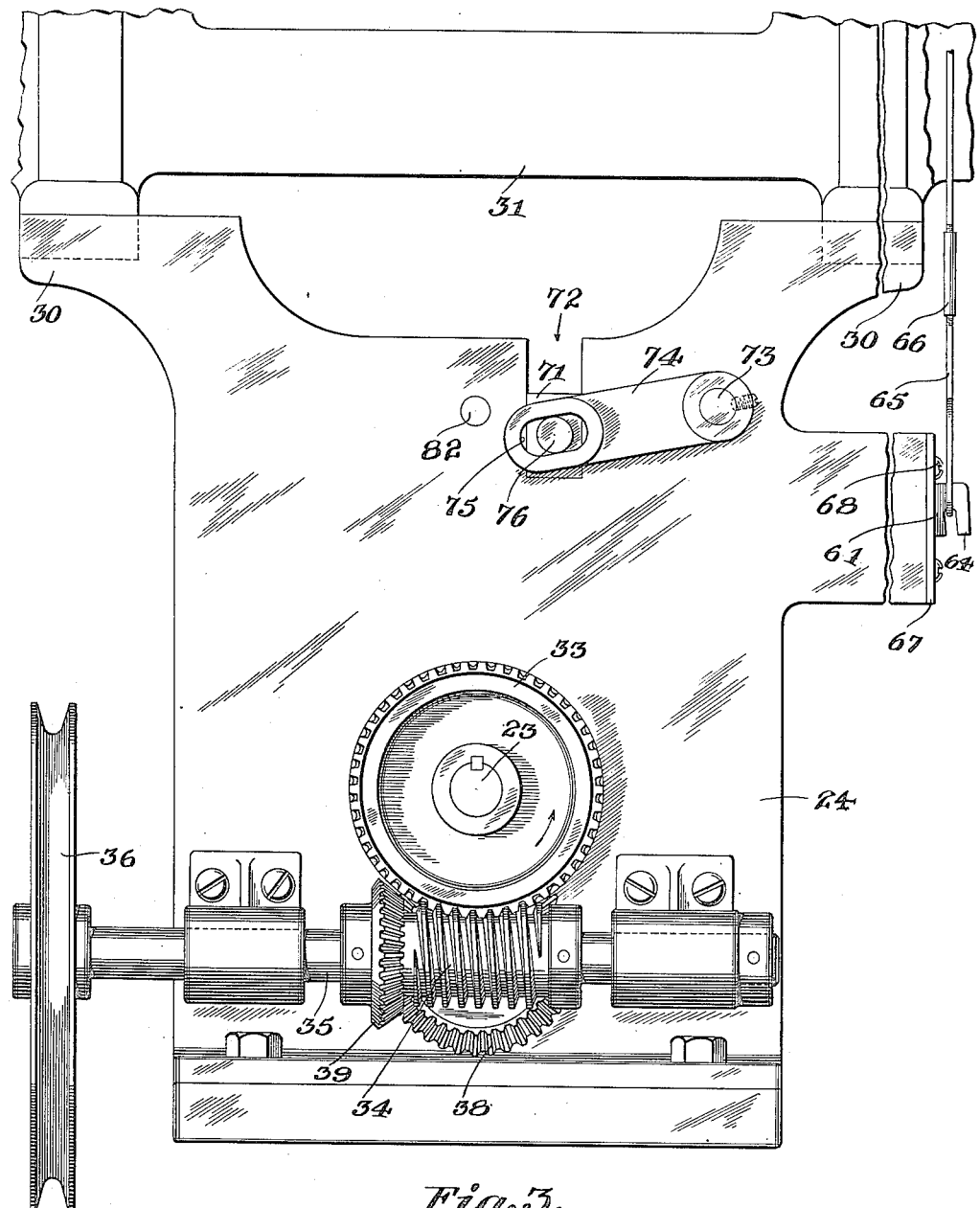

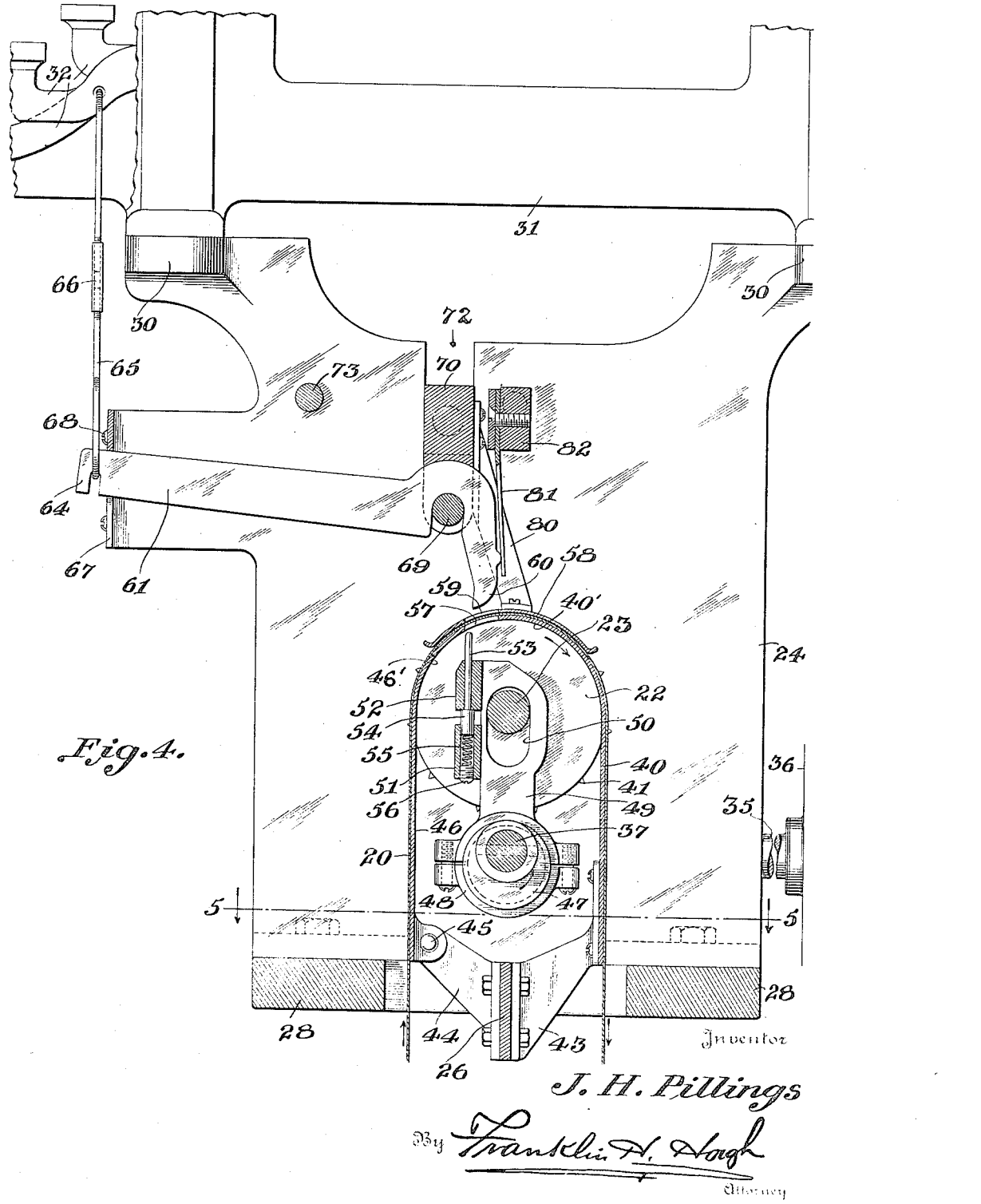

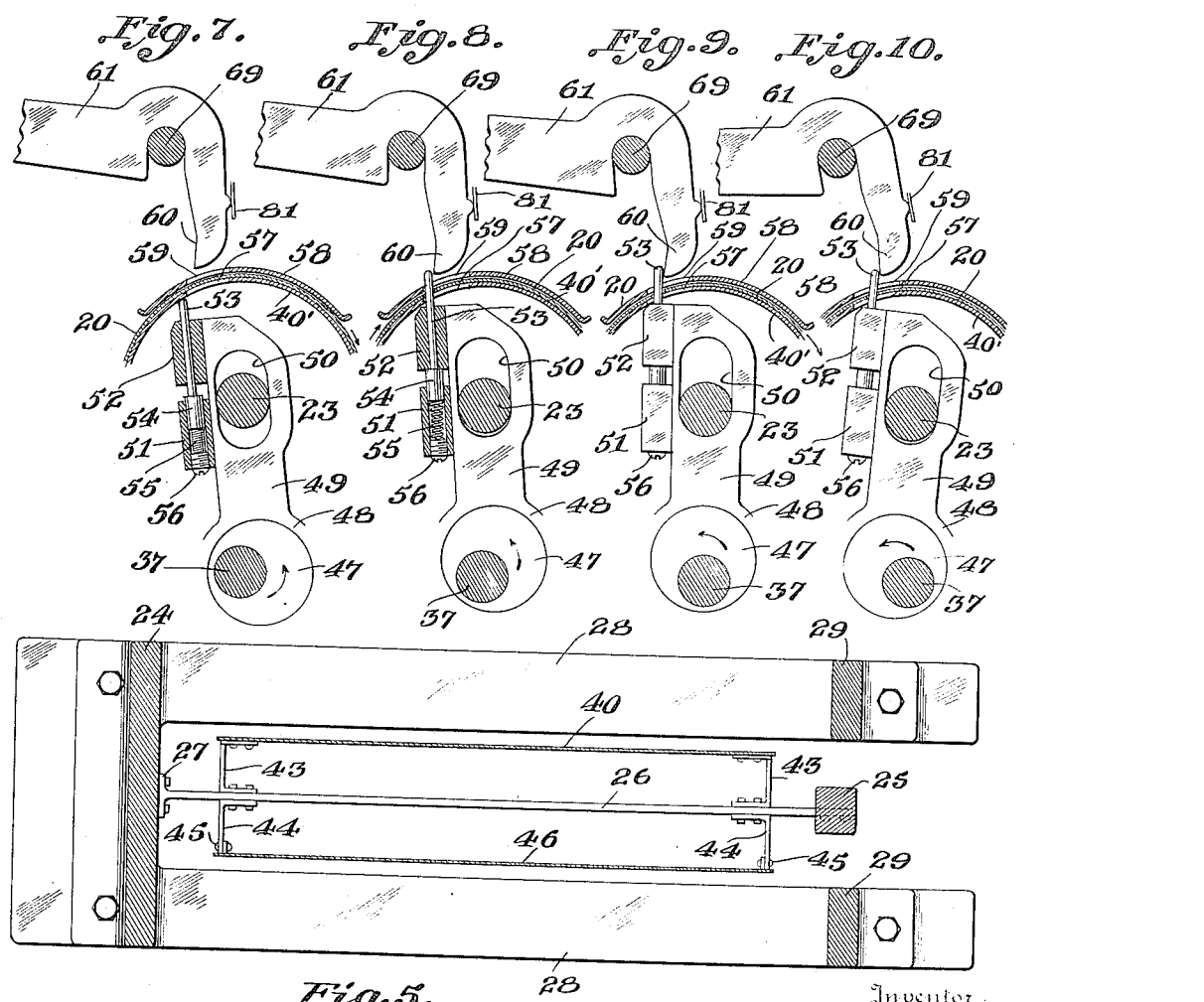

1,447,484

UNITED STATES PATENT OFFICE.

JOHN H. PILLINGS, OF HAMILTON, OHIO.

TYPEWRITER-KEY-ACTUATING ORGANIZATION.

Application filed May 10, 1922. Serial No. 559,845.

*To all whom it may concern:*

Be it known that I, JOHN H. PILLINGS, a citizen of the United States, residing at Hamilton, in the county of Butler and State of Ohio, have invented certain new and useful Improvements in Typewriter-Key-Actuating Organizations, of which the following is a specification, reference being had therein to the accompanying drawings.

This invention relates to typewriter key-actuating organizations and has for an object to provide mechanical means for actuating the keys of a typewriter in response to a master sheet, embodying new and improved features imparting to the key a delicacy of touch and positiveness of actuation desirable for the proper and uniform printing of typewriter copy.

A further object of the invention is to provide a typewriter key-actuating organization having a movable perforated master sheet with a plurality of spring-pressed fingers normally moving into position to actuate key-operating devices but interrupted in their movement by the master sheet except at those points where the perforation registers with the path of movement of the spring-pressed fingers, permitting a single finger to pass through a single perforation and engage a single unit of the type-actuating mechanism.

A further object of the invention is to provide improved structural means for facilitating the introduction and removal of the master sheet.

A further object of the invention is to provide improved means for varying the width of the sheet-actuating device and to provide means for properly registering the series of perforations with the spring-pressed fingers.

A further object of the invention is to provide improved means for releasing the key-actuating mechanism from its position relative to the master sheet while the sheet is being removed and replaced, or for other purposes.

A further object of the invention is to provide improved means for maintaining the key-actuating mechanisms under spring tension with improved means for releasing the tension of all of the springs simultaneously to facilitate the removing of the actuating devices, as just above stated.

A further object of the invention is to provide an improved type of drive for the several parts of the mechanism.

With these and other objects in view the invention comprises certain novel units, parts, elements, combinations, functions and inter-actions, as disclosed in the drawings, together with mechanical equivalents thereof, as will be hereinafter more fully described and claimed.

In the drawings:

Figures 1 and 1ª are combined, a view of the device in front elevation, parts being broken away to show the internal construction;

Figure 2 is a view of the device in end elevation from the end indicated by arrow 2 at Figure 1ª;

Figure 3 is a view of the device in end elevation from the end indicated by the arrow 3 at Figure 1;

Figure 4 is a vertical transverse sectional view on line 4—4 of Figure 1ª;

Figure 5 is a horizontal sectional view of the base and supporting structure taken on line 5—5 of Figures 1 and 1ª and of Figures 2 and 4;

Figure 6 is an enlarged perspective view of the shaft-journaling member;

Figures 7, 8, 9 and 10 are diagrammatic views of the progressive steps in the actuation of a single key-operating unit in the operation of a key to print a letter.

Like characters of reference indicate corresponding parts throughout the several views.

The improved typewriter key-actuating organization which forms the subject matter of this application is adapted to operate from and in conjunction with a perforated master sheet 20, being provided with a plurality of perforations 21 produced by any approved means, such perforations representing the text of the matter to be written by the typewriter when actuated by the mechanism co-acting therewith.

The master sheet 20 is carried upon and driven by sprocket wheels 22 carried upon a shaft 23. The shaft 23 is journaled at one end in the frame member 24 and at the opposite end in a block 25. The block 25 is supported by a bar 26 which is rigidly secured to the end plate 24 as by means of the T-head 27, shown particularly at Figures 1 and 5, and extending in parallelism and intermediate the base bars 28. As will be noted, especially from Figure 5, these base bars 28 are preferably, though not necessarily, integral with the end plate 24 and extend to and are preferably, though not necessarily, integral with the opposite end plate 29. These end plates 24 and 29 are provided with ledges 30 upon which is placed a typewriter conventionally shown by means of a frame 31, which for the purposes of this application may be considered a typewriter of the usual and ordinary type provided with the usual and ordinary type keys 32, as shown conventionally at Figure 4.

The shaft 23 is positively driven in any approved manner, as by rigidly securing to said shaft a worm gear 33 (see Figs. 1 and 3) which engages a worm 34 mounted upon a counter shaft 35 and driven from any convenient source of power and by any approved transmission mechanism, a grooved pulley 36 being illustrated as a conventional means for applying the power thereto, it being understood that the invention is in no way limited thereto.

Extending longitudinally of the machine and in parallelism with the shaft 23 is a second shaft 37 likewise journaled in the end plate 24 at one end and the block 25 at the opposite end. This shaft 37 is driven by means of a beveled gear 38 rigidly secured thereto and meshing with a beveled gear 39 carried upon the shaft 35. It will be apparent that with the two shafts 23 and 37 inter-geared, as illustrated, the shaft 37 will rotate at a higher rate of speed than the shaft 23 for the purposes hereinafter mentioned.

Intermediate the sprockets 22 a guide plate 40 is positioned having a curvature indicated at 40', the exterior arc of which corresponds substantially with the curvature of the sprockets 22 between which it is located and extending to carry the master sheet 20 intermediate such sprockets. The sprockets are provided with studs 41 which engage uniformly spaced perforations 42 in the margins of the master sheet 20 so that as the sprockets 22 rotate, the studs 41 engage these perforations and move the master sheet slidably over the curved part 40' of the plate 40. The plate 40 is rigidly secured to the bar 26 by means of brackets 43, as shown more particularly at Figures 2 and 4, and like brackets 44 are also rigidly secured to the bar 26 and provide hinges 45 for the plate 46 which extends upwardly and is provided with a slight curvature 46', abutting against the plate 40 and together with such plate 40 when both are in position, forming an arch over the operating mechanism, the top of such arch coinciding with the curvature of the sprockets 22. The plate 46 is hinged at 45 merely for the purpose of access to the structure mounted within the arch and is held in position by the master sheet 20 when in operative position or in any approved manner.

The shafts 23 and 37 extend through the arch just above referred to, the latter shaft being provided with eccentrics 47 about which are mounted eccentric straps 48 carrying arms 49. In the practice it will be found that two of these arms 49 will be sufficient, although the present invention is not limited to such number and the arms, whatever their number, are provided with slots 50 embracing the shaft 23 and by reason of which the arms 49 may move upwardly and downwardly upon this shaft 23 and acquire an angular movement as well, such movement being illustrated in steps at Figures 7 to 10 inclusive.

Extending longitudinally of the device and secured adjacent the opposite ends of the arms 49 are bars 51 and 52, each provided with concentric perforations, the perforations of the bar 51 being preferably larger than the perforations of the bar 52. Slidably mounted in the perforations of the bar 52 are a plurality of fingers 53 provided with enlarged portions 54 proportioned to slide in the perforations of the bar 51, springs 55 being also seated in the perforations of the bar 51, as shown more particularly at Figures 4, 7 and 8, being held in position by means of a screw plug 56 for the purpose of exerting stress upon the fingers 53 tending to move them to the extreme of their movement outwardly from the bar 52.

The bars 51 and 52 being rigidly secured to the arms 49 and the pins 53 carried thereby under the tension of the springs 55, it is obvious that when the arms 49 and bars 51 and 52 are moved upwardly by the rotation of the shaft 39 and the eccentrics 47, the pins will move into the curvature 40'. The plate 40 at the curvature 40' is provided with a plurality of slots 57 corresponding in number to and registering with the pins 53 which in turn correspond in number to the keys upon the typewriter 31.

Above the curvature 40' of the plate 40 a plate 58 is located having slots 59 registering with the slots 57 of the plate 40 and normally spaced away from the curvature 40' of said plate 40 only a sufficient distance to provide space for the passage of the master sheet 20. It is obvious that when one of the perforations 21 of the master sheet is in register with the slots 57 and 59 one of the fingers 53 projected upwardly by the movement of the arm 59 will pass through the perforation and through the slots 57 and 59, as indicated at Figures 7 to 10 inclusive. It will also be noted that the master sheet is moving in the direction indicated by the arrow and that by reason of the rotation of the shaft 37 and eccentrics 47 in the opposite direction, as will result from the gearing noted, the movement of the pin 53 inserted through the slots 57, 59 and the perforation 21 will be in consonance with the movement of the master sheet 20, so that, as the pin, escaping from its engagement with the curved plate 40", as shown at Figure 7, will pass through the perforation of the master sheet, as indicated at Figure 8, and the continued movement will move this pin also in consonance with the movement of the master sheet until it is withdrawn by the movement of the eccentric 47 in the position shown at Figure 10.

It is, of course, apparent that only one of the perforations 21 will register at one time with any of the slots 57 and 49, so that only one of the pins 53 will project upwardly through some of said slots, the others being depressed, as by engagement with the curved plate 40' and then being retained from extending by its engagement with the master sheet at an unperforated position. The Figures 7 to 10 inclusive indicate only the position of the parts when the pin projects through the master sheet and through the registering slots 58 and 59, all of the other pins being depressed.

The pin 53 extending through the master sheet and slots, as indicated at Figures 7 to 10 inclusive will, in its movement, as indicated in said Figures, engage the toe 60 of the corresponding lever 61. The number of levers 61 corresponds to the number of pins 53 and consequently to the number of keys on the typewriter and at their extremities are provided with hooks 64, which engage links 65, which in turn extend upwardly and engage the key levers 32 of the typewriter, as shown more particularly at Figure 4. While only one of these links 65 has been illustrated, it is to be understood that the number will correspond to the number of levers 61, which also corresponds to the number of type levers 32. For convenience of adjustment a turn-buckle 66 is interposed in the length of the link 65.

Adjacent the hooks 64 the several levers 61 extend through a slotted plate or comb 67 rigidly secured to the end plates 24 and 29 in any approved manner, as by the screws 68. This comb 67 is only a guide for the proper positioning of the several levers 61 and for maintaining such levers in proper spaced relation. The levers 61 are fulcrumed upon a rod 69 which extends through a bar 70 having slots registering with the slots of the comb 67 and holding the levers 61 in proper spaced relation. This bar 70 has terminal blocks 71 slidable in slots 72 in the end plates 24 and 29. Extending also across and journaled in the end plates 24 and 29 is a shaft 73 having at its opposite ends rigidly secured thereto arms 74 with slots 75 engageable upon pins 76 upon the ends of the bar 70, so that as the shaft 73 is oscillated, the arms 74 will oscillate therewith. One or both of these arms 74 is provided with an approximately right-angular arm 77, as shown more particularly at Figures 1ª and 2, with a spring-pressed latch 78 adapted to engage a perforation in the end plate 29 to hold the bar 70 at its downward or operative position and a socket 79 into which the latch 78 engages when the shaft 73 is oscillated. The oscillation of the shaft 73 so that the latch 78 engages the depression 79 raises the blocks 71 in the slots 72 and therewith the bar 70. This guide bar has carrying brackets 80 rigidly secured thereto and in turn rigidly secured to the curved plate 58, so that as the bar 70 is raised the levers 61 fulcrumed upon the shaft 69 are also raised raising therewith the bracket 80 and the curved plate 58.

To exert the proper restraining tension upon the several levers 61 a plurality of springs 81 are provided bearing at one end against the nose 60 of the lever 61 and at their opposite ends rigidly secured to a bar 82 which extends across and is journaled in the end plates 24 and 29. An arm 83 is rigidly secured to one end of this bar 82 and is provided with a latch 84 secured to the latch 79 adapted to hold the bar 82 with the springs 81 in tension-exerting position or to swing to the depression 85 (see Fig. 2) whereupon all of the springs 81 are oscillated with the bar 80 and all are released from their tensioning engagements with the levers 61.

While it has been stated that the bar 26 extending longitudinally of the frame and supporting the block 25 positions the latter to journal the shafts 23 and 37, it is obvious that some means for providing auxiliary support to prevent vibration when the device is operating is desirable. This auxiliary means comprises a bar 86 pivoted at 87 to the end plate 29 and having perforations 88 engaging spaced pins 89 upon the block 25. It also carries a pin 90 engaging a perforation in the end plate 29, as shown more particularly at Figures 1ª and 2. A latch 91, pivoted at 92 is provided with a hook 93 engaging over this bar 86 and rendering all rigid when the bar is in closed position, as shown at said Figures 1ª and 2 and the block 25 rigidly supported, thereby supporting in its turn the extreme end of the bar 26.

To compensate for master sheets, the marginal perforations 42 of which are not uniform, or for the purpose of moving the entire sheet laterally to provide more accurate registration of the perforations 21 with the slots 57 and 59, the sprockets 22 are mounted slidably upon the shaft 23 preferably by means of being feathered as indicated at 94 in Figure 1. A collar 95 is mounted upon a threaded shank 96 of the hub or boss 97 and is provided with recesses 98 to receive a spanner or like implement for the purpose of rotating said collar to move the sprockets longitudinally along the shaft, a spring 99 being provided in each instance bearing against a collar 100 tending to hold the sprockets firmly against the collars 95 and in the adjustment required. It is obvious that by adjusting only one of the sprockets variation of the interval between the marginal perforations 42 of the master sheet may be compensated for, or by moving both of said sprockets 22 the entire sheet may be moved laterally to cause the perforations 41 to register more accurately with the slots 57 and 59.

In operation the rotation of the shaft being stopped at such position that the bars 52 and 51 are at or adjacent their lowest limit of movement, the shaft 82 is oscillated by the manipulation of the arm 83 until the latch 84 engages in the depression 85, releasing the springs 81 from their engagement with the noses 60 of the levers 61. The bar 70 is now raised by the manipulation of the arms 77 and 74 until the latch 78 engages in the depression 79. The raising of this bar 70 raises the noses of the several levers 61 and also raises the curved plate 58. The bar 86 is now unlatched by manipulating the latch 91 and swung open upon its pivot 87. The arch consisting of the plates 40 and 46 is now fully open so that the master sheet may be inserted endwise from the end indicated by arrow 2 at Figure 1ª and moved entirely along until the marginal perforations register with the studs 41 upon the sprockets 22. The bar 86 is now closed and latched by the use of the latch 91, the bar 70 lowered by manipulating the levers 77 and 74 and the bar 80 oscillated to bring the springs 81 into tensioning engagement with the levers 61 and latched. The device is now in position to operate. Power being applied now to the pulley 36 or its equivalent rotates the shafts 23 and 37 in the directions indicated by the arrows in the several figures. This rotation of the shaft 23 causes the rotation of the sprockets 22 carrying the master sheet over such sprockets and slidably over the curvature 40' of the plate 40 until one of the perforations 21 of such sheet is in register with the slots 57 and 59. The rotation of the shaft 37 and eccentric 47 causes the arms 49 and bars 51 and 52 to travel in the irregular orbit, as indicated in the conventional Figures 7 to 10 inclusive, so that one of the fingers 53 will pass through the perforation 21 registering with the slots 57 and 59 and into engagement with the nose 60 of the corresponding lever 61. The continued movement of these parts as indicated in said conventional figures causes the fingers 53, as they move to move the nose 60 against the tension of its spring 81 and to depress the integral lever 61 and thereby depress the link 65 and the connected typewriter key 32. The continued rotation of the shaft 37 and eccentric 47 withdraws the finger 53, the position at Figure 10 being the extreme movement both upwardly and in key-actuating direction, the motion following such position being to withdraw the finger 53 from the perforation and the slots. The several parts will move in such timed relation that at each interval when one of the perforations 21 is or should be in registry with the co-acting slots 57 and 59 one of the fingers 53 will be in position to pass through such perforation 21 and slots 57 and 59 and into engagement with the nose 60 of the lever 61, as shown, whereby such lever is depressed and the key 32 of the typewriter actuated. It will be apparent from the illustration that the sprockets 22 are constantly driven and that the shaft 37 is also constantly driven, but that by reason of the position of the eccentrics 47 upon this shaft 37 the fingers 53 will be properly positioned to pass through one of the perforations 21 at such times as said perforation is in registry with the slots 57 and 59 and will, by reason of the relative speed of the two rotating shafts travel with the master sheet 20 as it progresses driven by the sprockets 22 until the finger 32 is withdrawn from the perforation 21, following which, all of the fingers will rise into position at the interval, the next perforation 21 being in registry with some other of said slots 57 and 59, whereupon some other finger 53 will pass through said perforation in said slots and engage another one of the noses 60 of the levers 61. By this means each time one of the perforations 21 in the master sheet 20 is in registry with any pair of the slots 57 and 59 there will be one of the spring fingers 53 moved upwardly and into position to pass through said perforation 21 and said slots 57 and 59 and engage the lever as aforesaid. The perforations in the master sheet will obviously be so positioned that the sequence of engagement of the fingers 53 with the noses 60 will operate the type keys of the typewriter in the required sequence to print the necessary text upon the sheet in the usual manner. The perforation of these master sheets is performed in a manner already well known in the art and no novelty in such perforation is claimed in the present invention.

Other movements of the typewriter as for instance for spacing, the return movement of the carriage and the advance of the platen for line spacing will be accomplished by mechanisms wholly unrelated to the present invention, which is directed only to the actuation of the key levers.

It is obvious that after the master sheet has performed its function and as many copies of the text been produced automatically upon the typewriter as may be desired, it is removed by opening the latch bar and simply moving the parts in the direction opposite to that heretofore directed for the introduction of the sheet and a new sheet replaced as occasion may require.

What I claim to be new is:

1. A typewriter key-operating organization comprising means for moving a master sheet, a plurality of reciprocating and oscillating spring-pressed fingers moving toward and with the moving master sheet, and a plurality of type-actuating levers positioned in the path of movement of the spring-pressed fingers.

2. A typewriter key-actuating organization comprising a stationary guide member, means to move a perforated master sheet over the guide member, said guide member being provided with openings positioned to register with some of the perforations in the master sheet, a plurality of spring-pressed fingers, means to reciprocate and oscillate the spring-pressed fingers toward and with the movement of the master sheet and toward the perforations of the guide member, and a plurality of actuating levers fulcrumed upon the side of the guide member opposite the spring fingers positioned in the path of movement of said spring fingers.

3. A typewriter key-actuating organization comprising an arcuate guide having perforations in its curved part, means to drive a perforated master sheet over and upon the arcuate portion of the guide member, said guide member being provided with perforations at said arcuate part, a plurality of actuating levers fulcrumed adjacent the guide member and having extremities extending contiguous to said perforations, spring fingers upon the side of the guide member opposite the fulcrumed levers in number corresponding to the levers and perforations of the guide member, and means to reciprocate said spring fingers and to move the fingers in consonance with the movement of the master sheet, the direction of movement tending to force said spring fingers through the perforations of the guide member into engagement with the adjacent part of the actuating levers.

4. A typewriter key-actuating organization comprising an arcuate guide member having perforations through its curved part, a plurality of levers fulcrumed adjacent the curved part of the guide member and having extremities extending contiguous to the perforations, a plurality of spring-pressed fingers upon the side of the guide member opposite the levers, means to reciprocate and oscillate said spring-pressed fingers, said means tending to force said fingers through the perforations of the guide member to engage and act upon the levers, and means to manually raise said levers out of position for engagement by said fingers.

5. A typewriter key-actuating organization comprising a guide member rigidly mounted at its lower edges and having an upper curved portion provided with a series of laterally extending slots, a plurality of levers fulcrumed upon a common axis in parallelism with the major axis of the guide member and provided with portions extending contiguous to and above the slots, spring-pressed fingers mounted within the arcuate guide member corresponding in number to the slots of the guide member and the levers, means to reciprocate and oscillate said guide fingers tending to force such fingers upwardly through and along said slots into engagement with and to actuate the levers, and means to raise the said levers simultaneously upon their fulcrums out of position for engagement by the spring-pressed fingers.

6. A typewriter key-actuating organization comprising a guide member composed of sheet material secured rigidly to a frame along its lower edges spaced apart and extending upwardly to a curved portion at the top, said curved portion being provided with a series of slots extending laterally of said curved portion, a plurality of bell crank levers positioned above the arcuate portion having each a leg extending contiguous to the slot and a common fulcrum in substantial parallelism with the major axis of the guide member, a structure mounted within the guide member, means to reciprocate the structure vertically and oscillate it laterally, a series of spring-pressed fingers carried by said contained structure corresponding in number to the slots of the guide member and the said levers, said moving means tending to force said spring-pressed fingers upwardly through said slots and to travel laterally into engagement with and to actuate the said levers, and means to raise said levers away from their proximity to the guide member upon their common fulcrum.

7. A typewriter key-actuating organization comprising an arcuate guide member provided with slots, a plurality of levers mounted above the arcuate member upon a common fulcrum extending in parallelism with the guide member, a plurality of springs exerting tension upon said levers, means to be at times inserted upwardly through the guide member into actuating engagement with the levers, manual means to release the springs from the levers simultaneously, and manual means to lift the levers upon their common fulcrum simultaneously out of proximity to the gide member.

8. A typewriter key-actuating organization comprising a guide member, sprockets having their peripheries substantially coinciding with portions of the guide member and adapted to move a perforated master sheet over said guide member, a plurality of levers fulcrumed adjacent the guide member upon a common fulcrum in substantial parallelism with the axes of said sprockets and having parts extending into juxtaposition with the guide member, means adapted at times to be inserted through perforations in the master sheet and into actuating engagement with some of said levers, and means to lift said levers upon their common fulcrum out of such engaging position.

9. A typewriter key-actuating organization comprising an arcuate guide member, sprockets journaled upon the opposite end of said arcuate guide member and having peripheries substantially coinciding with the curvature of said arcuate member and adapted to move the perforated master sheet over said guide member, a plurality of levers fulcrumed adjacent to said guide member upon a common fulcrum substantially parallel with the axes of said sprockets and having parts extending contiguous to said arcuate guide member, a plurality of spring-pressed fingers, means to simultaneously move said fingers toward the arcuate guide member and master sheet and to move said fingers in consonance with the movement of said master sheet, said fingers being proportioned to pass through perforations in the master sheet and into moving and actuating engagement with said levers, and means to withdraw the levers from the said actuating position.

10. A typewriter key-actuating organization comprising a frame, a guide member comprising spaced sheets joined by an arcuate portion at the top, said arcuate portion being provided with a series of laterally extending slots, sprockets at the opposite ends of said arcuate portion having peripheries substantially coinciding with the curvature of said arcuate portion, means to drive said sprockets to move a perforated master sheet over the perforations of said guide member, means to adjust the sprockets to insure registration of the perforations of the master sheet with the slots in the guide member, a plurality of spring-pressed pins disposed within the guide member, means to move said pins simultaneously toward the slots and oscillate them to move in consonance with the movement of the perforated sheet, said pins being proportioned to extend through perforations of said master sheet registering with said slots, and a plurality of key-actuating levers fulcrumed adjacent to the guide member positioned to be engaged by any of said pins extending through the perforations of said master sheet and to be actuated by the oscillatory movement of said finger.

11. A typewriter key-actuating organization comprising a guide member composed of spaced side walls and an arcuate top portion, said arcuate portion being provided with a series of laterally extending slots, sprockets journaled adjacent the ends of said arcuate portion and having peripheries coinciding substantially with the curvature of said arcuate portion and adapted to drive a perforated master sheet over the slots, parallel shafts journaled within the guide member, one of said shafts supporting said sprockets, eccentrics carried by the other of said shafts, a frame member mounted to slide upon the first-mentioned shaft and actuated by the eccentrics of the other shaft, a plurality of spring-pressed fingers carried by said frame member proportioned and positioned to move under the actuation of the eccentrics toward and tending to pass through said slots and to move in said slots in consonance with the movement of the master sheet, and a plurality of key-actuating levers fulcrumed adjacent said guide member and proportioned to be engaged by the fingers extending through the perforations of the master sheet.

12. A typewriter key-actuating organization comprising a frame having an arched opening at one end, a guide member mounted within the frame having an arcuate part substantially in alinement with the arched opening, sprockets journaled upon a shaft extending axially of the arcuate portion of the guide member and the arch of the opening, sprockets carried by said shaft having peripheries coinciding substantially with the arcuate portion of the guide member, a bar extending across the structure and rigidly attached at one end to the frame structure and at its opposite end supporting a journal for the shaft within said arch, and a manual latch pivoted to the frame member adapted to engage with said journaling part as a support for said journal auxiliary to said bar.

13. A typewriter key-actuating organization comprising a frame composed of spaced end plates one of which is provided with an arched opening, a guide member positioned within the frame and extending between the end plates, a shaft journaled within the guide member concentric with the curvature thereof, sprockets carried by the shaft having their peripheries substantially coinciding with the curvature of said guide member and adapted to move a perforated master sheet over said guide member, a bar mounted above said guide member, means to lift said bar manually away from said guide member, a plurality of levers fulcrumed upon said bar and having parts extending contiguous to said guide member, an auxiliary guide plate carried rigidly by said bar and normally disposed adjacent to the curvature of said first-mentioned guide, a means supporting the shaft, and a bar extending across the arch pivoted to the side plate and tending to form an auxiliary support for said shaft.

14. A typewriter key-actuating organization comprising a frame member, an arched guide member mounted within the frame member, parallel shafts journaled within the arched guide member, arms within the guide member slidably mounted upon one shaft, eccentrics mounted upon the other shaft driving said arms in a longitudinally slidable and oscillating movement upon said first-mentioned shaft, a structure extending longitudinally within the guide member and carried by said arms, a plurality of spring-pressed fingers carried by said structure positioned and tending to pass through perforations in the guide member when moved by the eccentrics, and mechanism positioned for engagement by said fingers converting said motion into typewriter-actuating stresses.

In testimony whereof I hereunto affix my signature.

JOHN H. PILLINGS.